(12) United States Patent
Tax

(10) Patent No.: US 11,203,813 B2
(45) Date of Patent: Dec. 21, 2021

(54) DEVICE COMPRISING A CHANNEL, A CATHODE, AN ANODE AND A POWER SOURCE, AND METHOD FOR THE PRODUCTION OF CHLORINE DIOXIDE

(71) Applicant: Bright Spark B.V., Joure (NL)

(72) Inventor: Maurice Paul Tax, Sneek (NL)

(73) Assignee: Bright Spark B.V., Joure (NL)

( * ) Notice: Subject to any disclaimer, the term of this patent is extended or adjusted under 35 U.S.C. 154(b) by 111 days.

(21) Appl. No.: 16/482,833

(22) PCT Filed: Dec. 4, 2017

(86) PCT No.: PCT/NL2017/050808
§ 371 (c)(1),
(2) Date: Aug. 1, 2019

(87) PCT Pub. No.: WO2018/147725
PCT Pub. Date: Aug. 16, 2018

(65) Prior Publication Data
US 2020/0232104 A1     Jul. 23, 2020

(30) Foreign Application Priority Data

Feb. 7, 2017   (WO) ................ PCT/NL2017/050074
Feb. 7, 2017   (WO) ................ PCT/NL2017/050075

(51) Int. Cl.
*C25B 1/26*       (2006.01)
*C25B 15/08*      (2006.01)
(Continued)

(52) U.S. Cl.
CPC .............. *C25B 1/26* (2013.01); *C02F 1/4674* (2013.01); *C25B 1/30* (2013.01); *C25B 9/17* (2021.01);
(Continued)

(58) Field of Classification Search
CPC ........... C25B 1/26; C02F 1/461; C02F 1/4674
(Continued)

(56) References Cited

U.S. PATENT DOCUMENTS 6,203,688 B1   3/2001   Lipsztajn et al.
10,287,188 B2  5/2019   Iacopetti et al.
(Continued)

FOREIGN PATENT DOCUMENTS

CN   101746857 A   6/2010
FR   2784979 A1    4/2000
(Continued)

OTHER PUBLICATIONS

Bergmann et al, The formation of chlorine dioxide in the electrochemical treatment of drinking water for disinfection, Electrochimica Acta, vol. 50, Issue 25-26, Sep. 2005, pp. 5218-5228 (Year: 2005).*
(Continued)

*Primary Examiner* — Harry D Wilkins, III
(74) *Attorney, Agent, or Firm* — The Webb Law Firm

(57) ABSTRACT

The invention relates to a device, including: a channel including an inlet at a first end of the channel and an outlet at a second end of the channel; a cathode arranged in the channel, which cathode includes a first segment selected from titanium, stainless steel and titanium provided with a mixed metal oxide coating layer including ruthenium oxide and/or iridium oxide and a second segment including carbon, such as a carbon (felt) segment, arranged downstream of the first segment, an anode, arranged in the channel, selected from titanium or, stainless steel and titanium provided with a mixed metal oxide coating layer including ruthenium oxide and/or iridium oxide, which coating layer faces the cathode; and a power source electrically connected to the cathode and the anode. The invention further relates to a method for the production of chlorine dioxide.

19 Claims, 5 Drawing Sheets

(51) Int. Cl.
    *C25B 11/031* (2021.01)
    *C02F 1/467* (2006.01)
    *C25B 11/02* (2021.01)
    *C25B 9/17* (2021.01)
    *C25B 9/65* (2021.01)
    *C25B 11/044* (2021.01)
    *C25B 11/057* (2021.01)
    *C25B 11/061* (2021.01)
    *C25B 11/081* (2021.01)
    *C25B 11/097* (2021.01)
    *C25B 11/04* (2021.01)
    *C25B 1/30* (2006.01)
    *C02F 1/461* (2006.01)

(52) U.S. Cl.
    CPC ............... *C25B 9/65* (2021.01); *C25B 11/02* (2013.01); *C25B 11/031* (2021.01); *C25B 11/04* (2013.01); *C25B 11/044* (2021.01); *C25B 11/057* (2021.01); *C25B 11/061* (2021.01); *C25B 11/081* (2021.01); *C25B 11/097* (2021.01); *C25B 15/08* (2013.01); *C02F 2001/46161* (2013.01); *C02F 2001/46171* (2013.01); *C02F 2201/46105* (2013.01)

(58) Field of Classification Search
    USPC ......................................................... 204/272
    See application file for complete search history.

(56) References Cited

U.S. PATENT DOCUMENTS

| 2003/0000848 | A1* | 1/2003 | Lipsztajn | C25B 9/17 |
| | | | | 205/556 |
| 2003/0230492 | A1* | 12/2003 | Kadlec | F25D 17/042 |
| | | | | 205/556 |
| 2007/0000790 | A1 | 1/2007 | Morales et al. | |
| 2015/0122741 | A1* | 5/2015 | Eckelberry | C02F 1/4674 |
| | | | | 210/704 |
| 2017/0283962 | A1* | 10/2017 | Jung | C25B 11/036 |

FOREIGN PATENT DOCUMENTS

| GB | 2176497 A | 12/1986 |
| WO | 2016066544 A1 | 5/2016 |

OTHER PUBLICATIONS

Schubert et al, "Investigation of Hydrodynamics in Electrolytic Cells", from Annual Report 2007 by Institute of Safety Research, pub. by Forschungszentrum Dresden, 2008 (no month available), pp. 50-55 (Year: 2008).*

Drogui et al., "Oxidising and Disinfecting by Hydrogen Peroxide Produced in a Two-Electrode Cell", Water Research, 2001, pp. 3235-3241, vol. 35, No. 19.

* cited by examiner

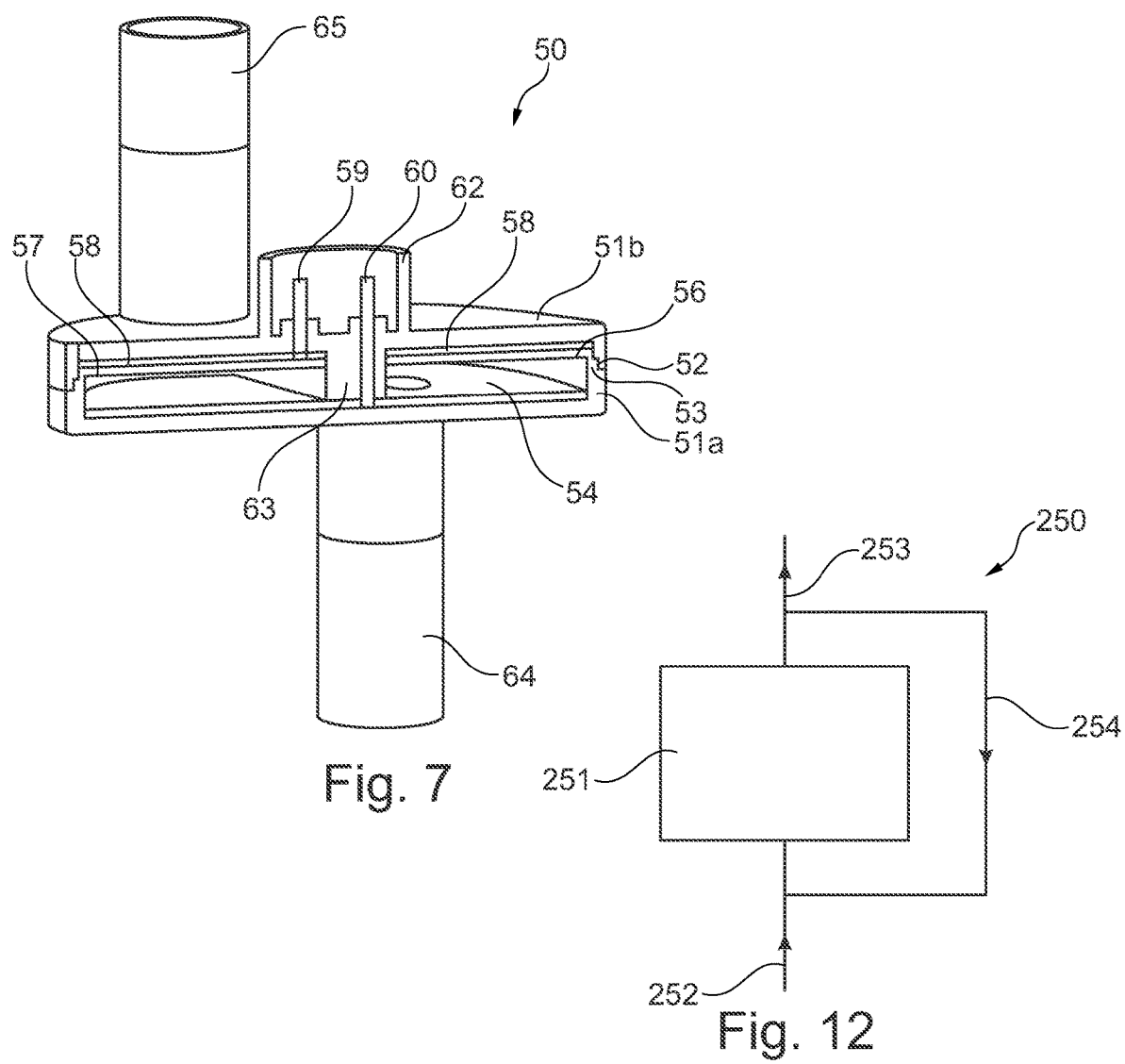
Fig. 7
Fig. 12
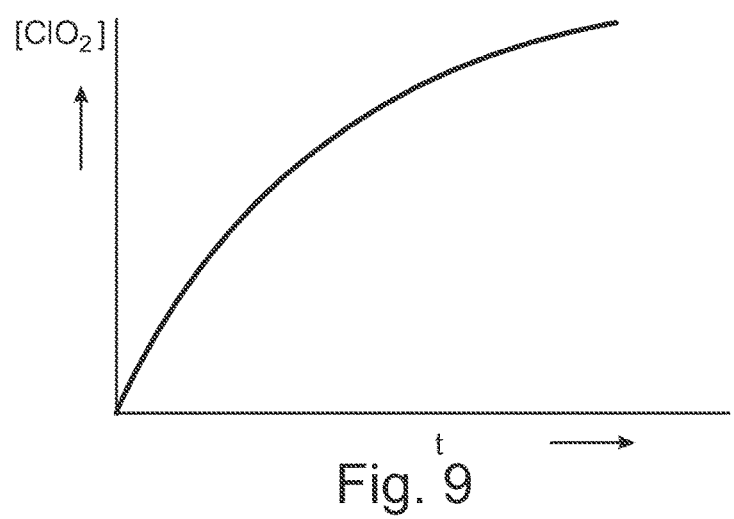
Fig. 9

DEVICE COMPRISING A CHANNEL, A CATHODE, AN ANODE AND A POWER SOURCE, AND METHOD FOR THE PRODUCTION OF CHLORINE DIOXIDE

CROSS-REFERENCE TO RELATED APPLICATIONS

This application is the United States national phase of International Application No. PCT/NL2017/050808 filed Dec. 4, 2017, and claims priority to International Application Nos. PCT/NL2017/050074 and PCT/NL2017/050075, both filed Feb. 7, 2017, the disclosures of which are hereby incorporated by reference in their entirety.

BACKGROUND OF THE INVENTION

Field of the Invention

The invention relates to a device comprising a channel, a cathode, an anode and a power source.

Technical Considerations

In order to disinfect water, various techniques may be used.

One of such techniques is disclosed in the article "Oxidising and disinfecting by hydrogen peroxide produced in a two-electrode cell" by P. Drogui et al. (Wat. Res., Vol. 35 (2001), No. 13, pp. 3235-3241). This article discloses a device for increasing the hydrogen peroxide content. This article describes a device with a channel and a carbon felt cathode connected to a steel grid and a titanium anode with a ruthenium oxide layer, both connected to a power source and both disposed with their length direction perpendicular to the direction of flow inside the channel.

The device does not require the presence of chemicals other than water in the water stream, which simplifies the production of peroxide in water and which reduces the risk of an increase of the amount of trace elements in water. Because of the direction of flow inside the channel, the cathode and the anode need to be porous in order to create an adequate water stream through the channel. The manufacturing costs of such materials is relatively high. In addition, the yield of this device, and especially in relation to the surface area of the cathode and anode material used, is relatively low. It has also been shown that hydrogen peroxide does not result in complete disinfection.

Chlorine dioxide is another example of an oxidising agent which is known for its suitability to disinfect water. Currently, chlorine dioxide used for treatment of water is typically prepared from sodium chlorite, hydrochloric acid and optionally sodium hypochlorite. The presence of such starting materials is however undesirable in a number of applications, for instance since it presents safety risks, and since it is costly.

It is an object of the invention to reduce of even obviate the above mentioned disadvantages.

SUMMARY OF THE INVENTION

This object is achieved with a device, comprising:
a channel, comprising an inlet at a first end of the channel and an outlet at a second end of the channel;
a cathode, arranged in the channel, which cathode comprises a first segment selected from titanium, stainless steel and titanium provided with a mixed metal oxide coating layer comprising ruthenium oxide and/or iridium oxide and a second segment comprising carbon, such as a carbon (felt) segment, arranged downstream of the first segment,
an anode, arranged in the channel, selected from titanium or, stainless steel and titanium provided with a mixed metal oxide coating layer comprising ruthenium oxide and/or iridium oxide, which coating layer faces the cathode; and
a power source, electrically connected to the cathode and the anode.

A water stream may be directed through the channel of the device from the first end, then along the anode and the cathode towards the second end, opposed to the technique as described in the cited prior art which suggests a flow through the anode and the cathode of the cell. By the application of power through the power source, the concentration of water disinfecting components, such as chlorine dioxide, will be increased in the water stream.

The application of one anode which faces two cathode segments, defines a first and second zone respectively within the device. In the first zone, it is expected that water may be converted into hydrogen and oxygen by the following reactions:

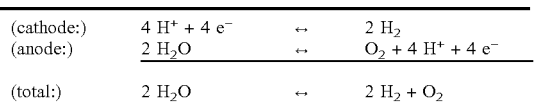

In the second zone, it is suspected that water or hydrogen may be converted with the oxygen formed in the first zone into hydrogen peroxide by the following reactions:

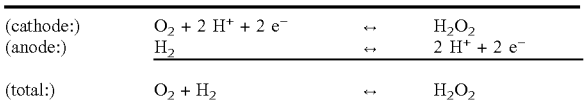

The excess of hydrogen gas formed in the two zones in total may be extracted from the device easily due to its low solubility in water and may be used for other purposes whenever desired.

It has however also been found that the creation of the first and the second zone leads to an increase of the content of chlorine dioxide ($ClO_2$). In the first zone, in which the anode preferably faces the mixed metal oxide segment, ionic chloride present in the water is suspected to be converted into (sodium) hypochlorite, whereas in the second zone, in which the anode faces segment comprising carbon such as a carbon based segment, this hypochlorite is suspected to be converted into chlorine dioxide. It is suspected that the formation of chlorine oxide depends on the presence of oxygen (O2) as created in the first zone. It is in this respect in particular found to be important that the second zone is located downstream of the first zone. For the production of chlorine dioxide, it is important that water includes (ionic) chloride, which is normally present in tap water. The use of tap water in conjunction with the device is therefore preferred.

The anode is preferably an acid washed or high grade titanium.

The ruthenium oxide and/or iridium oxide layer (for instance such a layer of the anode) preferably faces both the opposing electrode such as first segment and the second segment of the cathode.

The channel is enclosed by one or more channel walls, retaining the water stream within the channel. The channel walls may be connected to each other through connecting means, in order to increase ease of assembly or disassembly, such as a protrusion and a cooperating cavity.

The channel may comprise consecutive chambers, with the anode extending in both chambers, and the first segment of the cathode (solely) in the first chamber and the second segment of the cathode (solely) in the second chamber. This creates a better distinction between both process steps.

Preferably, the inlet and the outlet are arranged in line with each other. By arranging the inlet and the outlet in line with each other, the connection of the device within the range of a straight conduit or to a second device according to the invention will be enhanced. Preferably, the inlet and the outlet also have the same cross-section in the direction of flow within the inlet and the outlet for this purpose.

More than one of the device according to the invention may be connected to each other, i.e. with the outlet of a first device to the inlet of the subsequent device, in order to create a chain of devices in order to increase the amount of disinfecting components such as hydrogen peroxide and/or chlorine dioxide as required.

The cathode comprising carbon such as a carbon based cathode may for instance comprise compressed carbon plates or carbon felt, e.g. made of graphite, a nano(sized) layer of on a conducting substrate, a carbon film or a carbon mesh, which may be drawn to be porous. The carbon comprising cathode segment may be made completely out of carbon. The carbon comprising segment may optionally be supplied with a conducting grid or layer, preferably made of metal, e.g. a titanium grid or layer, to further assist in electrically connecting this cathode segment to the circuit when preferred.

Since the device will be in contact with water during operation, the metal chosen for the anode and/or cathode preferably comprises and more preferably consists of a metal (or mixed metal oxide) which prevents corrosion, such as titanium.

The device is a device for converting chloride containing water into active chlorine, such as chlorine dioxide and/or a device for disinfection of water.

A filter may be arranged upstream of the device with the anode and the cathode in the channel provided with the power source (an electrolytic cell) in order to filter particulate matter out of the water.

The channel wall may comprise or may be made of polypropylene or acrylonitrile butadiene styrene (ABS). Both materials are found safe for treatment of water and are therefore preferred options as a base material for the fabrication of the housing of the device.

At least one of the cathode and the anode may be arranged in the channel wall. In such a situation, in which at least one of the cathode and the anode functions as a part of the channel wall, retaining the water stream within the channel, it is no longer required to arrange another channel wall along at least a part of the length of the cathode or anode concerned, since the cathode or anode concerned will retain the water within the channel itself. This reduces material costs of the device and prevents a water stream between the tube and the channel wall. An arrangement of the elements concerned along the channel wall may be equated to a situation in which the elements are arranged in the channel wall.

The preference described in the previous paragraph may in particular be advantageous if the first cathode segment is further arranged along the first leg of a U-shaped channel and the second cathode segment is arranged along the second leg of this U-shaped channel, since the first cathode segment and the second cathode segment may then be electrically connected outside of the channel, without comprising the tightness of the channel and without the necessity of applying adhesives, which may increase the chance of contamination by dissolution in the water stream.

The device according to the invention may comprise a connection to a ballast tank of a floating structure, such as a ship or a boat. In a floating structure such as a boat or a ship, ballast water may be used to balance the structure in the water, dependent on the load of the ship, such as by cargo. In order to purify the ballast water of biological materials, such as plants, animals, viruses and other microorganisms, chlorine dioxide may be used. The device according to the invention may advantageously be installed on such a floating structure, since it is no longer necessary to provide in a stock of chlorine dioxide, since ionic chloride present in the water is converted into chlorine dioxide on the floating structure itself. An output of the ballast tank is preferably connected to the input of the device according to the invention (before passage of the electrolytic cell), whereas an output of the device (after passage of the electrolytic cell) is connected to the input of the ballast tank. The device may also or alternatively be provided in a harbor for a similar purpose. The device may also be provided in other water storage units, water heaters, pools, spas, wells, lakes, drinking water applications and similar fields of application.

In a first preferred embodiment of the device according to the invention, the first segment and the second segment are electrically connected to each other.

In a second preferred embodiment of the device according to the invention, the device further comprises a recirculation tube connecting the outlet of the channel with the inlet of the channel for recirculating at least a part of the output of the channel through the inlet of the channel.

At least a part of the output of the electrolytic cell may furthermore be recycled by a pump to the input side of the electrolytic cell, in order to further increase the chlorine dioxide yield in each passage over the electrolytic cell. Preferably, the characteristics of the device are set such that, on average, the feed passes the cell at least twice. In this way, the capacity of the electrolytic cell may be kept small, which is for instance advantageous when the amount of space available is limited, e.g. on a floating structure.

In a third preferred embodiment of the device according to the invention, at least one of the cathode and the anode is arranged in the channel substantially parallel to the direction of flow in the channel, and the anode is arranged at a distance from the cathode in a direction perpendicular to the length of both the cathode and the anode.

In this way, the flow inside the device is along the cathode and anode, which is beneficial for obtaining a good conversion.

The cathode and the anode are preferably oriented with their length direction along the direction of flow within the channel to optimize the contact surface area.

The anode and/or the cathode are preferably oblong, which may mean that the anode and/or the cathode have a length parallel to the direction of flow which is significantly higher than one or both of the main dimensions of the respective cathode or anode.

Preferably, the anode and the cathode (preferably both of the cathode segments) are parallel, i.e. are with their length and depth direction parallel. This increases the efficiency of the device, since the anode and the cathode segments are placed at an equal distance of each other along their length.

In a fourth preferred embodiment of the device according to the invention, one of the cathode and the anode is rod-shaped, and the other of the cathode and the anode is a cylindrical tube, arranged with its height direction parallel to the length direction of the rod-shaped cathode or anode.

The cylindrical tube completely envelopes the solid rod-shaped element and is preferably arranged in or close to the channel wall to minimize a water stream between the tube and the channel wall. The tube and the rod are typically held in a fixed position with respect to the tube by suitable mounting means, preferably to or through the channel wall.

Preferably, the rod is cylindrical. Preferably, the center line of the tube coincides with the length axis of the rod-shaped element, such to arrange the rod in the middle of the tube, in order to equalize the reaction conditions on all sides of the rod.

It is preferred if the rod-shaped element is the anode, since the anode does not comprise two zones and in more cases than the cathode does not have a conducting grid or wire for electrical connection. The tube may be provided more easily with these features than the rod.

In a fifth preferred embodiment of the device according to the invention, the anode and/or at least one and preferably both of the segments of the cathode are plate-shaped, and the surface area of the cathode and the surface area of the anode facing each other are preferably substantially equal.

The use of plate-shaped anodes and/or cathode segments increases the efficiency of the device, since the elements concerned are provided with a large effective surface area.

In particular, the plate-shaped anodes and/or cathode segments may be disc-shaped. If one of the anode and the cathode is disc-shaped, the other of the anode and the cathode is preferably disc-shaped as well in order to optimize exposure of the anode to the cathode and to ease construction of the device.

By furthermore equalizing the surface area of the cathode and the anode which face each order, a balanced execution of the reactions within the device is obtained.

By choosing the surface area of the first segment of the cathode and the second segment of the cathode to be substantially equal, a balanced execution of the reactions within the device is obtained, without, where applicable, requiring an additional supply of oxygen to the stream when producing hydrogen peroxide.

In a sixth preferred embodiment of the device according to the invention, the channel is substantially U-shaped and preferably the first cathode segment is arranged along the first leg of the U-shaped channel and the second cathode segment is arranged along the second leg of the U-shaped channel.

The creation of a device with a U-shaped channel makes the device more compact. Since the inlet is located at the distal end of the first leg of the U-shape (at a distance from the passage opening between the two legs of the U-shape), and since the outlet is located at the distal end of the second leg of the U-shape, such a U-shape also brings the inlet and the outlet of the channel relatively close to each other, while still obtaining a relatively large area in which the anode and cathode are facing each other. It also assists in the connection of the device to for instance a conduit.

Preferably, the anode extends from the first leg to the second leg of the U-shaped channel. Thereby, it is possible to actually use one anode which bridges the distance from the first leg to the second leg across the (total) length direction of the anode for both the first leg and the second leg of the U-shaped channel, which functions as the anode in both the first leg and the second leg of the channel. This increases the ease of production of the device, since it is no longer required to arrange two anodes along both of the legs of the U-shaped channel. It also reduces the necessity of placing a channel wall between the first leg and the second leg of the U-shaped channel, since the one anode functions as a channel wall.

More preferably, the first cathode segment is arranged along the first leg of the U-shaped channel and the second cathode segment is arranged along the second leg of the U-shaped channel. By arranging the first cathode segment and the second segment accordingly, a more defined distinction is created in the device between the first zone and the second zone, which may enhance the efficiency or selectivity of reactions in the device.

It may also enhance the easiness of electrically connecting the first cathode segment and the second cathode segment in a reliable way, which may be connected to each other by an AMP connector through a side wall of the device (separate from the anode and the cathode).

In a seventh preferred embodiment of the device according to the invention, the edge of the second cathode segment overlaps the first cathode segment, wherein the overlapping part of the second cathode segment preferably faces the anode.

By creating an overlap between the edge of the first segment of the cathode segment and the second cathode segment, the connection between the segment is further consolidated, reducing the chances of leakage between the segments. A suitable connection, e.g. an adhesive, may be used in the overlapping zone of both segments to further consolidate the connection when required.

In an eighth preferred embodiment of the device according to the invention, the cathode is at least partially porous.

While the anode and both of the cathode segments may be non-porous, it is preferred if the cathode is at least partially porous, to promote the unwanted process of calcification to occur within the pores of the cathode, thereby reducing the amount of disruptions in the device as a whole as a consequence of calcification.

Preferably, the dimensions of the device and the cathode and/or anode, which may be plates, are chosen such that the edges of these within the housing are arranged adjacent to at least three walls of the housing to even further increase the effective surface area (based on a housing of the device shaped as a rectangular cuboid).

In a ninth preferred embodiment of the device according to the invention, the ratio of a) the distance from the anode to the cathode perpendicular to the length direction of the anode to b) the length of the anode along the channel is equal or larger than 1:5, preferably equal or larger than 1:10.

While it has been shown that the efficiency of the device is increased with the use of an oblong anode and/or cathode segments, it has in particular been found that choosing the ratio according to this embodiment, leads to a further increase in the efficiency of the device, in which the further preferred embodiment increases the efficiency even further.

In a tenth preferred embodiment of the device according to the invention, the device further comprises a tank and a pump and/or a flow switch, arranged between the tank and the at least one electrolytic cell.

By providing, in addition to the cell, a (storage) tank and a pump and/or a flow switch, it is possible to regulate the amount of feed which is fed or recycled from the tank to the electrolytic cell.

The invention further relates to a method for the production of chlorine dioxide, comprising the steps of:
providing a device according to the invention;

feeding an aqueous feed with ionic chloride from the inlet towards the outlet of the device with the power source of the device switched on.

In the method according to the invention, the output of the outlet may be used in treatment of ballast water or in treatment in agriculture or horticulture, such as bulb cultivation. The water obtained with the current device may advantageously be used in applications where large amounts of purified water (free from biological materials) are required. Treatment of ballast water, as well as agriculture or horticulture are examples of such applications.

In a first preferred embodiment of the method according to the invention, the contact time in the channel of the device is between approximately 2 and 20 seconds.

Preferably, the device is used at a contact time between approximately 2 and 20 seconds per passage through the device, or more particularly, between approximately 1 and 10 seconds per passage along each cathode segment. A contact time chosen lower than 1 seconds will lower the conversion, whereas a contact time chosen higher than 20 seconds will lead to a too large production of oxygen ($O_2$), which is undesired for obtaining an optimum in conversion towards chlorine dioxide.

Typical flow rates are therefore chosen in the range between 2.0 and 5.0 L per minute.

In a second preferred embodiment of the method according to the invention, the aqueous feed comprises, at the inlet of the device, a salt selected from $R_1^+R_2^-$, wherein $R_1$ is selected from Li, Na, K, Rb, Cs, Fr, and preferably from Na, K, and wherein $R_2$ is selected from F, Cl, Br, I, At, and is preferably Cl, most preferably in a concentration of approximately 18 grams per liter or 0.308 moles per liter.

It has been observed that the addition of such salts to the aqueous feed at the inlet side of the device results in an increase of the amount of chlorine dioxide at the outlet side. This effect is especially observed with a concentration of 18 grams per liter NaCl or 0.308 moles per liter. It is thus expected that the same effect is observed for other salts at such a salt molarity.

In a third preferred embodiment of the method according to the invention, the aqueous feed comprises, at the inlet of the device, sodium hydroxide, preferably in a concentration of approximately 100 mL/m$^3$.

It has been observed that the addition of sodium hydroxide to the aqueous feed at the inlet side of the device results in a further increase of the amount of chlorine dioxide at the outlet side.

BRIEF DESCRIPTION OF THE DRAWINGS

These and other features of the invention will be elucidated in conjunction with the accompanying figures.

FIG. 7 shows an exploded view of the device according to FIG. 6.

FIG. 9 shows the concentration of chlorine dioxide over time in the setup according to FIG. 8.

FIG. 12 shows a further embodiment of a device according to the invention.

DESCRIPTION OF THE INVENTION

Figure 1:
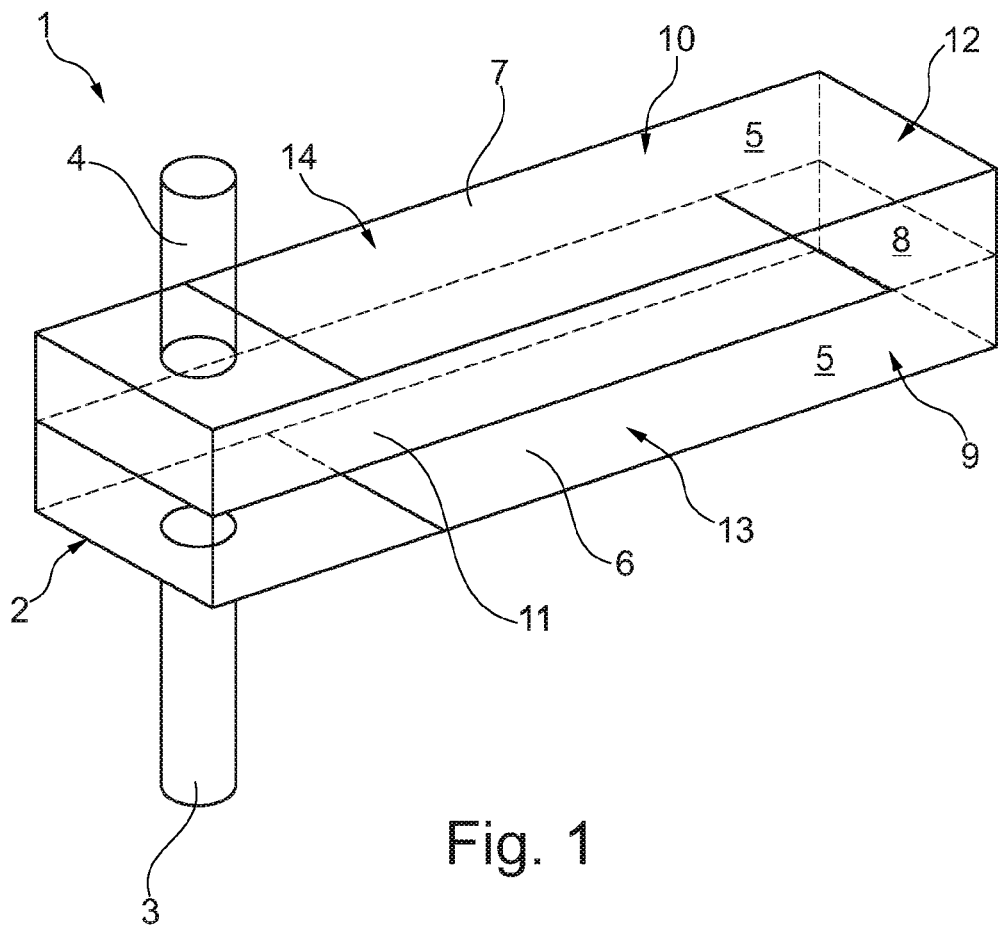
FIG. 1 shows a perspective partly transparent view of a device according to the invention with a U-shaped channel with the legs on top of each other.

FIG. 1 shows a perspective view of a device 1 according to the invention. The device 1 comprises a housing 2 with an inlet 3 and an outlet 4, and a channel 5 running from the inlet 3 towards the outlet 4 which is U-shaped. The U-shaped channel 5 has a first leg 6 and a second leg 7, connected at a passage opening 8, which is open. First leg 6 and second leg 7 of the U-shaped channel are arranged on top of each other with respect to the path between inlet 3 and outlet 4. An oblong first cathode segment 9 and an oblong second cathode segment 10 are arranged in the channel wall of the housing 2. An oblong anode 11 is located halfway between the first cathode segment 9 and the second cathode segment 10 (i.e. at a distance from both segments 9, 10) in a way that all elements 9, 10, 11 are parallel to each other. The cathode segments 9, 10 run in their length direction from the right side channel wall 12 towards inlet 3 and outlet 4, respectively and in their depth direction from front channel wall 13 to back channel wall 14. The length and depth of the elements 9, 10 and 11 is equal. The inlet 3 and outlet 4 are arranged in line with each other and their cross-sections are equal. The housing 2 is fully enclosed by walls, either formed by cathode segments 9, 10, channel walls 12, 13, 14, or other walls not further elucidated in FIG. 1, with the exception of openings for inlet 3 and outlet 4 and for electrically connecting the cathode 9, 10 and anode 11 (not depicted).

Figure 2:
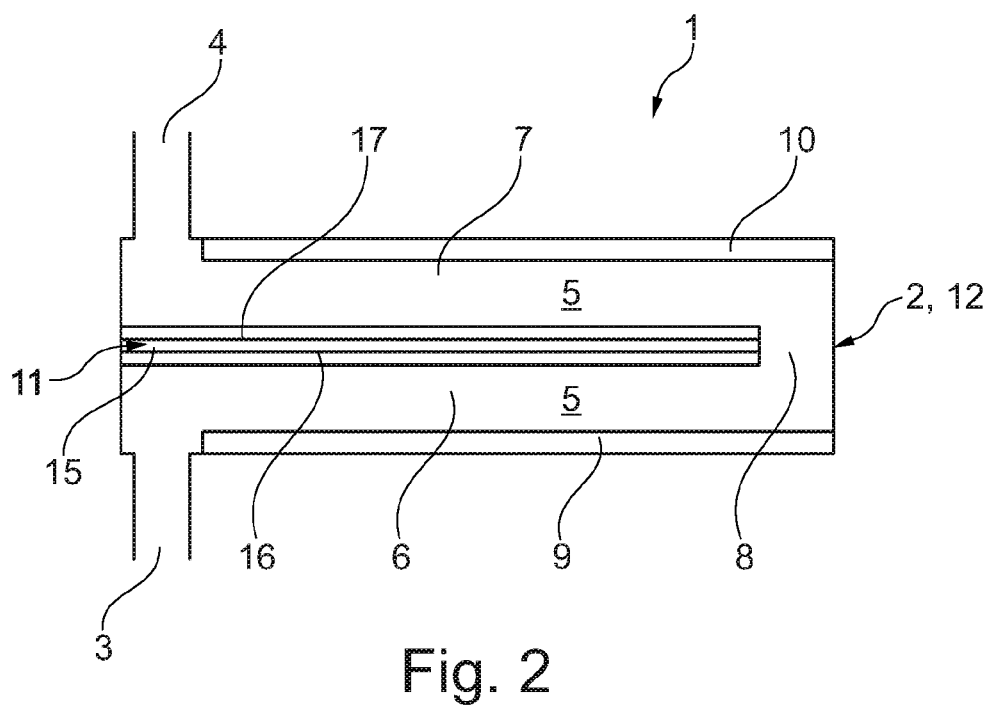
FIG. 2 shows a cross-section of the device according to FIG. 1.

As shown in FIG. 2 in more detail, the anode 11 comprises a titanium base 15 with ruthenium oxide layers 16, 17, each facing one cathode segment 9, 10 in the respective legs 6, 7 of the channel 5. The anode 11 bridges the distance from the first leg 6 of the U-shaped channel 5 to the second leg 7 of the U-shaped channel 5 across the length direction of the anode 11.

Figure 3:
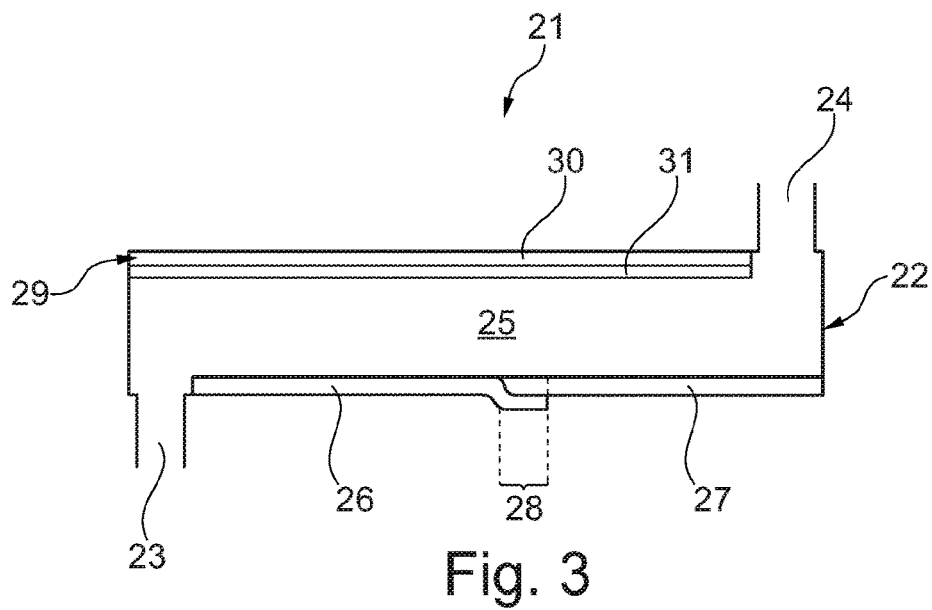
FIG. 3 shows a cross-section of a device according to the invention with an elongated channel.

An alternative embodiment of a device 21 according to the invention is shown in FIG. 3. The device 21 comprises a housing 22 with an inlet 23 and an outlet 24, and a channel running from the inlet 23 towards the outlet 24 which is elongated. A first oblong cathode segment 26 and a second oblong cathode segment 27 are arranged in the wall of the channel 25. The second cathode segment 27 forms an overlap 28 with first cathode segment 28, wherein the overlapping part of the second cathode segment 27 faces an oblong anode 29, arranged at a distance from the cathode 26, 27. The anode 29 also is arranged in an opposing wall of the channel 25. The elements 26, 27, 29 are parallel to each other. The length of cathode elements 26 and 27 is equal, and their length in total is equal to the length of anode 29. The housing 22 is fully enclosed by walls with the exception of openings for inlet 23 and outlet 24 and for electrically connecting the cathode 26, 27 and anode 29 (not depicted).

The anode 29 comprises a titanium base 30 with one ruthenium oxide layer 31 facing the cathode segments 26, 27 in the channel 25.

Figure 4:
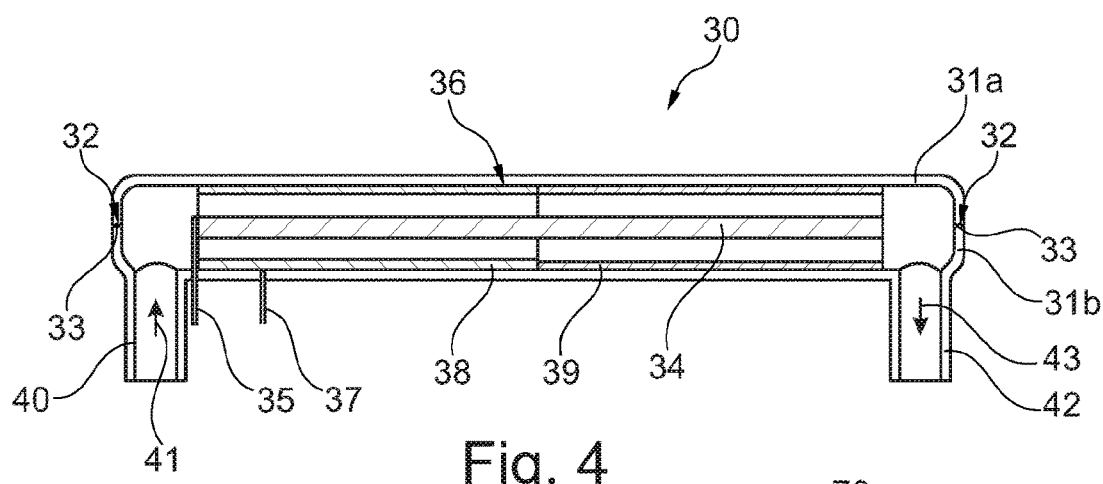
FIG. 4 shows a cross-section of another device according to the invention.
Figure 5:
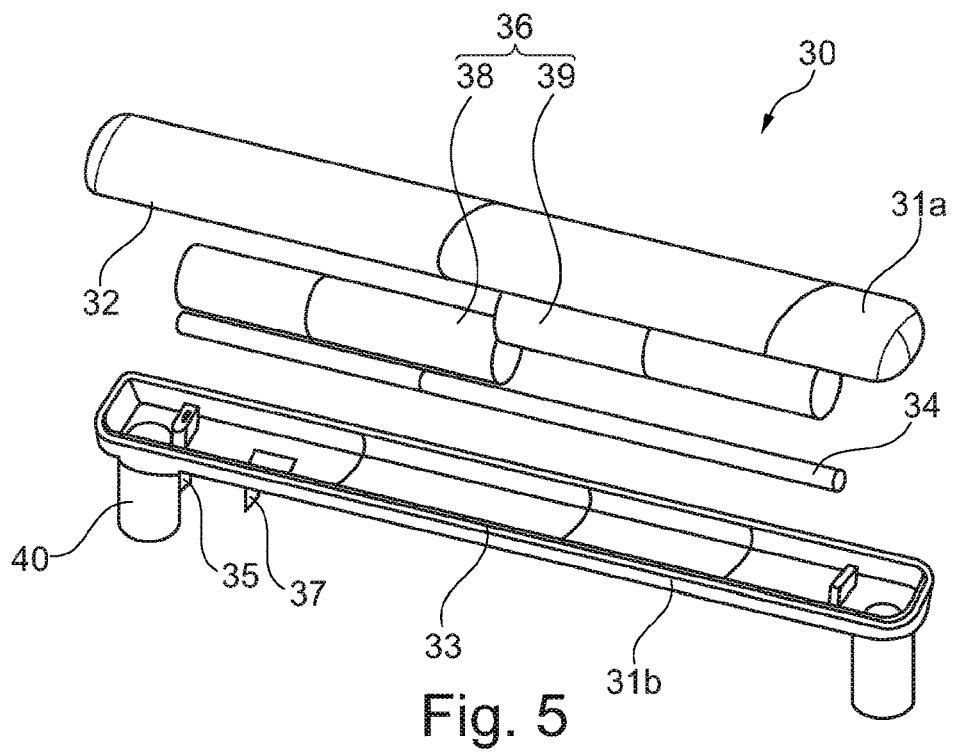
FIG. 5 shows an exploded view of the device according to FIG. 4.
Figure 6:
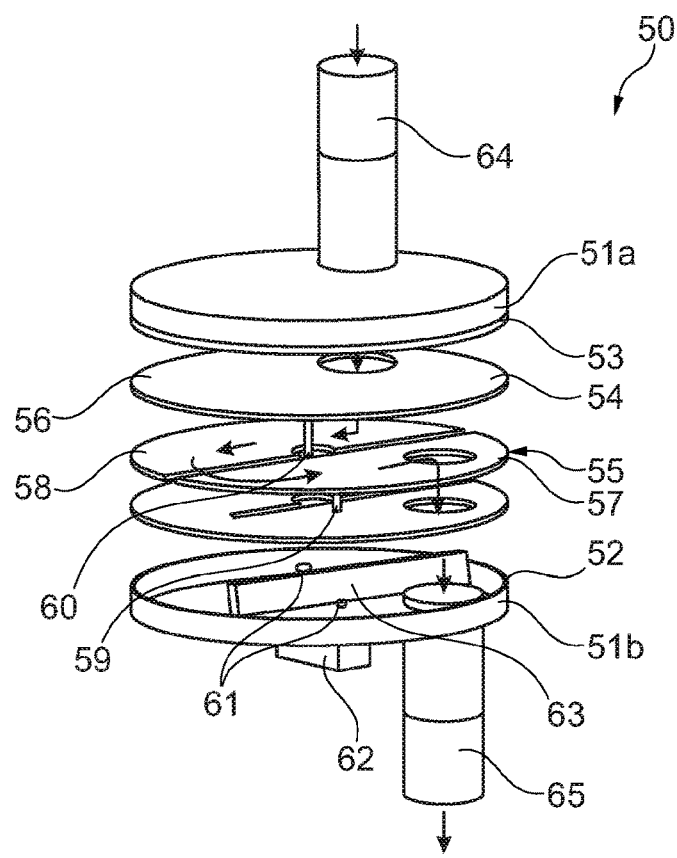
FIG. 6 shows a cross-section of another device with a U-shaped channel with the legs besides each other according to the invention.

FIGS. 4 and 5 show another embodiment of a device according to the invention. The device 30 comprises a housing 31 with a first housing part 31a and a second housing part 31b, fixed connectable to each other with connecting flange 32 and a connecting cavity 33, each running around the circumference of the housing parts 31a,b. Inside the housing 31, a solid rod-shaped anode 34 is disposed centrally within the housing 31 connected electrically through an electrical connection 35. The titanium/ruthenium oxide anode 34 is completely enveloped by a cathode 36 in the shape of a cylindrical tube, connected through an electrical connection 37. The cathode comprises two zones 38, 39, of which the first zone 38 is a titanium based zone, and of which the second zone 39 is a carbon felt zone, facing the anode, and a metal base for electrical connection beneath the carbon layer (not shown). A water stream is directed from the inlet 40 in direction 41 towards the outlet 42 in direction 43. FIGS. 6 and 7 show another embodiment of a device 50 according to the invention. The device 50 comprises a cylindrical housing 51 with a first housing part 51a and a second housing part 51b, fixed connectable to each other with connecting flange 52 and a connecting cavity 53, each running around the circumference of the housing parts 51a,b. Inside the housing 51, a disc-shaped titanium/[ruthenium and/or iridium oxide] anode 54 is arranged adjacent to the top wall of first housing part 51a, with the ruthenium oxide layer facing the cathode 55, which comprises a first titanium zone 56 and a second pressed carbon plate zone 57, with a titanium base layer 58 attached to the zones 56, 57 for connecting the cathode electrically to connection pin 59. Anode 54 is electrically connected to connection pin 60. Both connection pins 59, 60 extend through the bottom of the housing part 51b through a connection holes 61 to connection box 62. The bottom of the housing part 51b further comprises a wall 63 which makes the zone between anode 54 and cathode 55 U-shaped, with the legs of the U-shape arranged besides each other with respect to the direction from inlet 64 to outlet 65. The flow path within the device 50 is designated in FIG. 6 with arrows.

Figure 8:
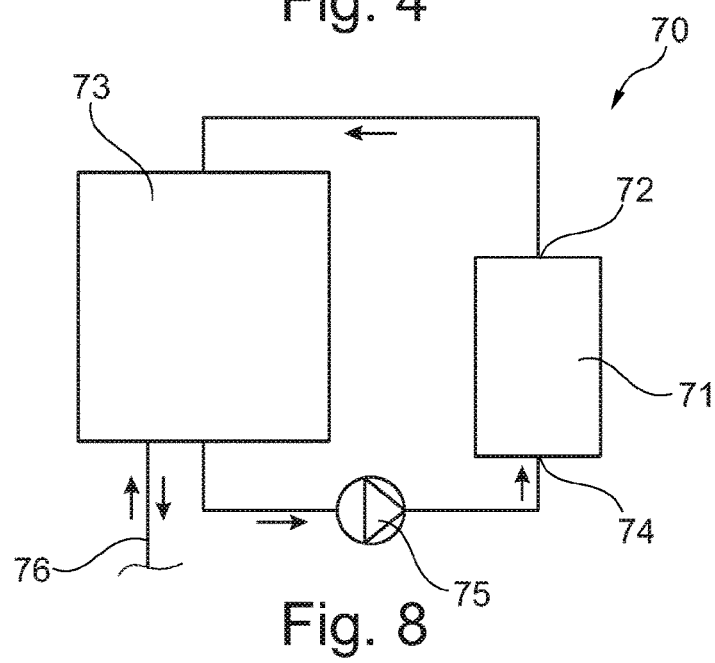
FIG. 8 shows a diagram of a device according to the invention.

In FIG. 8, a setup 70 with a device 71, such as a device 1 or device 21, is shown, arranged in a cycle. The output 72 of the device 71 is connected to a tank 73, from which at least a part is recycled to the input 74 of the device 71. Circulation through the setup 70 is controlled by a pump 75 provided with a flow switch. The water in the cycle may be exchanged through a connection 76 with a ballast tank of a ship.

FIG. 9 is a graph which shows the relation between the concentration of chlorine dioxide over time. As shown, as time passes, the concentration increases to level off to a maximum.

Figure 10:
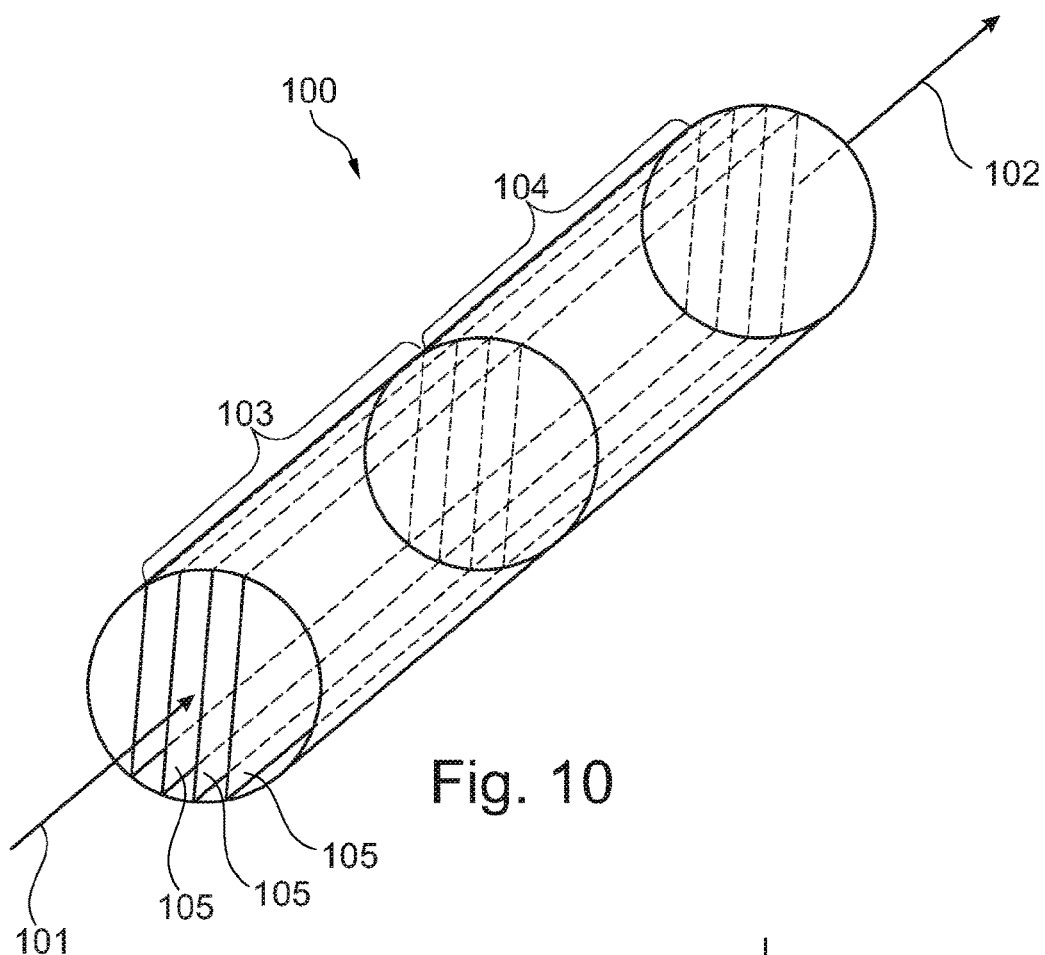
FIG. 10 shows another embodiment of a device according to the invention.

FIG. 10 shows another of a device 100 according to the invention, with an inlet 101, an outlet 102, a first zone 103 and a second zone 104. In the first zone 103 and second zone 104, there are a preferably even number (in this case four) of parallel plates 105, which are partly anodes and for the remainder cathodes (preferably in a 1:1 ratio). In first zone 103, the cathodes are titanium or stainless steel, and in the second zone, the cathodes are carbon or carbon felt. In both the first zone 103 and the second zone 104, the anode is a titanium provided with a mixed metal oxide coating layer comprising ruthenium oxide and/or iridium oxide, facing the cathode. In the first zone 103, the flow is allowed both between and around the plates 105, whereas in the second zone 104, the flow is exclusively between the plates 105.

Figure 11:
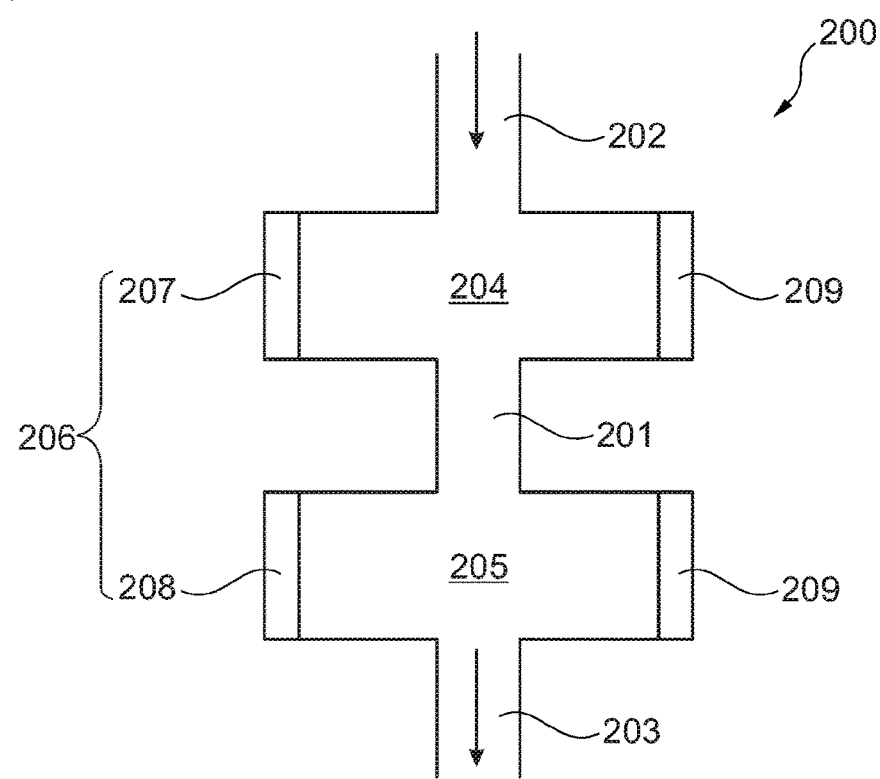
FIG. 11 shows an alternative embodiment of a device according to the invention.

FIG. 11 shows another device 200 according to the invention. The device 200 comprises a channel 201 with a channel inlet 202, a channel outlet 203. The channel 201 comprises first chamber 204 and subsequently second chamber 205. Cathode 206 comprises a first segment 207 in first chamber 204 and a second segment 208 in second chamber 205. Anode 209 extends in both first chamber 204 and second chamber 205.

FIG. 12 shows a device 250 with a reaction chamber 251 corresponding to the device of FIG. 1 with an inlet 252 (corresponding to inlet 3) and an outlet 253 (corresponding to outlet 4). The cathode and anode according to the invention are arranged in the reaction chamber 251 (not shown) in direction of flow. After leaving the reaction chamber 251, at least a part of the output of the reaction chamber 251 is recirculated to the inlet 252 via recirculation tube 254.

In all of the figures, details are shown not in proportion: some details may be drawn exaggerated compared to other elements for this purpose.

Example 1

A device with a U-shaped channel according to the invention was created according to FIGS. 1 and 2. The inlet and the outlet are disposed in line with each other and both have an inner radius of 4 mm. The distance between the anode (titanium grade 2 with a $RuO_2$-coating facing both legs of the channel) and the cathode perpendicular to the anode in both the first leg (first segment: titanium grade 2) and the second leg (second segment: carbon felt with titanium grid for electrical connection) of the channel is 2 mm. The dimensions of the anode and the first cathode segment are both 40 mm (along the direction of flow in the channel)×20 mm (the depth of the channel)×1 mm (the thickness of the anode or first cathode segment, respectively. The dimensions of the second cathode segment is 40 mm×20 mm×6 mm in a similar fashion. The passage opening between the first leg and the second leg of the U-shaped channel has a length of 8 mm and a depth of 20 mm. The other walls of the channel were made of polypropylene.

The cathode and the anode were connected to a 12 Volt 300 mA power source and a water stream of 2.0 liters per 25 minute was directed through the channel. The amount of chlorine dioxide was increased by 0.350 parts per million after passing the device compared to the concentration at the entrance of the device.

A series of such devices were also connected in a chain, i.e. with the outlet of a first device to the inlet of the subsequent device. An increase in chlorine dioxide concentration was achievable of 15 ppm (weight parts per million).

Example 2

The device according to example 1 was arranged in a cycle with a tank and a flow switch under the same set of conditions unless mentioned otherwise.

The cathode and the anode were connected to a 16.22 Volt 130 A power source and a water stream of 7.000 liters per minute with 18 grams per liter of ionic chlorine was directed through the channel. The amount of chlorine dioxide in the tank was 6500 parts per million.

The experiment was repeated with the addition of 100 mL/m$^3$ sodium hydroxide. The amount of chlorine dioxide in the tank was 12000 parts per million.

Example 3

The same device as used in example 1 was used for a series of experiments. All conditions were similar as in example 1, unless mentioned otherwise.

Water with an ionic chloride (Cl$^-$) content of 40 milligrams per liters was used.

In a first experiment, a 24 Volt 720 mA power source was used with a water stream of 2 liters per minute. Using a DPD-test, the amount of chlorine dioxide produced was found to be 0.935 ppm at the outlet (weight parts per million). The concentration of hydrogen peroxide was found to be 1 ppm at the outlet.

In a second experiment, a 12 Volt 290 mA power source was used with a water stream of 2 liters per minute. Using the same DPD-test, the amount of chlorine dioxide produced was found to be 0.33 ppm at the outlet. No substantial increase of hydrogen peroxide concentration was observed at the outlet.

US 2007/000790 A1 discloses a device comprising a channel, comprising an inlet at a first end of the channel and an outlet at a second end of the channel, a cathode and an anode, arranged in the channel, which may be made from titanium provided with a ruthenium oxide and iridium oxide catalyst and a power source, electrically connected to the cathode and the anode. US 2007/000790 A1 does not provide any experimental results achieved when using this device.

The invention claimed is:

1. A device, comprising:
a channel, comprising an inlet at a first end of the channel and an outlet at a second end of the channel;
a cathode, arranged in the channel, which cathode comprises a first segment selected from titanium, stainless steel and titanium provided with a mixed metal oxide coating layer comprising ruthenium oxide and/or iridium oxide and a second segment comprising carbon arranged downstream of the first segment,
an anode, arranged in the channel, selected from titanium or, stainless steel and titanium provided with a mixed metal oxide coating layer comprising ruthenium oxide and/or iridium oxide, which coating layer faces the cathode; and
a power source, electrically connected to the cathode and the anode,
wherein the anode and cathode are arranged in the channel substantially parallel to a direction of flow in the channel,
the anode is arranged at a distance from the cathode in a direction perpendicular to a length of both the cathode and the anode,
a surface area of the first segment of the cathode and a surface area of the second segment of the cathode are substantially equal,
a first zone is defined, in which the anode faces the first segment of the cathode, and a second zone is defined, in which the anode faces the second segment of the cathode, and
a surface area of the cathode and a surface area of the anode that face each other are substantially equal.

2. The device according to claim 1, wherein the first segment and the second segment are electrically connected to each other.

3. The device according to claim 1, wherein the device further comprises a recirculation tube connecting the outlet of the channel with the inlet of the channel for recirculating at least a part of the output of the channel through the inlet of the channel.

4. The device according to claim 1, wherein one of the cathode and the anode is rod-shaped, and wherein the other of the cathode and the anode is a cylindrical tube, arranged with a height direction parallel to a length direction of the rod-shaped cathode or anode.

5. The device according to claim 1, wherein the anode and/or at least one of the segments of the cathode are plate-shaped.

6. The device according to claim 5, wherein both of the segments of the cathode are plate-shaped.

7. The device according to claim 1, wherein the channel is substantially U-shaped and wherein the first cathode segment is arranged along a first leg of the U-shaped channel and the second cathode segment is arranged along a second leg of the U-shaped channel.

8. The device according to claim 1, wherein an edge of the second cathode segment overlaps the first cathode segment, wherein the overlapping part of the second cathode segment faces the anode.

9. The device according to claim 1, wherein the cathode is at least partially porous.

10. The device according to claim 1, wherein a ratio of a) a distance from the anode to the cathode perpendicular to a length direction of the anode to b) a length of the anode along the channel is equal or larger than 1:5.

11. The device according to claim 10, wherein the ratio is equal to or larger than 1:10.

12. The device according to claim 1, wherein the device further comprises a tank and a pump and/or a flow switch, arranged between the tank and at least one electrolytic cell.

13. The device according to claim 1, wherein the second segment comprises carbon felt.

14. A method for the production of chlorine dioxide, comprising:
providing a device according to claim 1;
feeding an aqueous feed with ionic chloride from the inlet towards the outlet of the device with the power source of the device switched on.

15. The method according to claim 14, wherein a contact time in the channel of the device is between approximately 2 and 20 seconds.

16. The method according to claim 14, wherein the aqueous feed comprises, at the inlet of the device, a salt selected from $R_1^+R_2^-$, wherein $R_1$ is selected from the group consisting of Li, Na, K, Rb, Cs, and Fr and wherein $R_2$ is selected from the group consisting of F, Cl, Br, I, and At.

17. The method according to claim 16, wherein the aqueous feed comprises, at the inlet of the device, sodium hydroxide.

18. The method according to claim 17, wherein a concentration of the sodium hydroxide is approximately 100 mL/m3.

19. The method according to claim 16, wherein $R_1$, is Na or K, and $R_2$ is Cl.

* * * * *